US007346541B1

(12) United States Patent
Cuttler et al.

(10) Patent No.: US 7,346,541 B1
(45) Date of Patent: Mar. 18, 2008

(54) SYSTEM, METHOD AND COMPUTER READABLE MEDIUM FOR ACQUIRING AND ANALYZING PERSONAL HISTORY INFORMATION

(75) Inventors: Michael J. Cuttler, Greensboro, NC (US); Ellen B. Cuttler, Greensboro, NC (US); Thomas A. Seddon, II, Durham, NC (US)

(73) Assignee: Law Enforcement Services, Inc., Greensboro, NC (US)

( * ) Notice: Subject to any disclaimer, the term of this patent is extended or adjusted under 35 U.S.C. 154(b) by 221 days.

(21) Appl. No.: 09/638,650

(22) Filed: Aug. 14, 2000

(51) Int. Cl.
*G06F 11/34* (2006.01)
*H04M 3/51* (2006.01)
(52) U.S. Cl. ....................................... 705/11
(58) Field of Classification Search ............ 705/4, 705/10–11; 434/236, 238
See application file for complete search history.

(56) References Cited

U.S. PATENT DOCUMENTS

| 3,628,255 | A | * | 12/1971 | Golden ....................... 434/325 |
| 4,627,818 | A | | 12/1986 | Von Fellenberg ........... 434/236 |
| 4,671,772 | A | | 6/1987 | Slade et al. .................. 434/219 |
| 4,975,840 | A | * | 12/1990 | DeTore et al. ................. 705/4 |
| 5,117,353 | A | * | 5/1992 | Stipanovich et al. ......... 705/11 |
| 5,135,399 | A | | 8/1992 | Ryan .......................... 434/236 |
| 5,344,324 | A | | 9/1994 | O'Donnell et al. .......... 434/258 |
| 5,503,561 | A | | 4/1996 | Cohen ......................... 434/236 |
| 5,551,880 | A | | 9/1996 | Bonnstetter et al. ........ 434/236 |
| 5,576,951 | A | * | 11/1996 | Lockwood ................... 705/27 |
| 5,696,981 | A | | 12/1997 | Shovers ....................... 704/10 |
| 5,737,494 | A | * | 4/1998 | Guinta et al. ................ 706/47 |
| 5,893,098 | A | * | 4/1999 | Peters et al. ................ 707/10 |
| 5,961,332 | A | | 10/1999 | Joao ............................ 434/236 |
| 5,978,767 | A | * | 11/1999 | Chriest et al. ................. 705/1 |
| 6,007,340 | A | | 12/1999 | Morrel-Samuels .......... 434/236 |
| 6,093,026 | A | * | 7/2000 | Walker et al. ............... 434/322 |

(Continued)

FOREIGN PATENT DOCUMENTS

JP   11338881 A  * 12/1999

OTHER PUBLICATIONS

Hammer, Edson G.; Lawrence, Kleiman, Getting to Know You, Personnel Administrator, v33n5, pp. 86-92, Dialog 00407752/9.*

(Continued)

*Primary Examiner*—Jeffrey A. Smith
*Assistant Examiner*—Russell Shay Glass
(74) *Attorney, Agent, or Firm*—Womble, Carlyle Sandridge & Rice, PLLC

(57) ABSTRACT

A computer based method for acquiring life history information from an applicant for employment to minimize positive response bias and enhance the veracity of the acquired life history information. A question collection related to at least one life event is presented to the applicant. The question collection is comprised of a revealed stem question and at least one hidden branch question, the hidden branch question being related to the stem question. Based on the stem question response, the method automatically determines whether to present at least one hidden branch question to the applicant. If a hidden branch question is presented to the applicant, the applicant's response is received and stored in the computer database. The response to the stem question and the response to the hidden branch question are predictive of a predefined negative outcome for the applicant.

34 Claims, 36 Drawing Sheets

U.S. PATENT DOCUMENTS

| | | | | |
|---|---|---|---|---|
| 6,102,970 | A * | 8/2000 | Kneipp | 717/155 |
| 6,275,812 | B1 * | 8/2001 | Haq et al. | 705/11 |
| 6,289,319 | B1 * | 9/2001 | Lockwood | 705/35 |
| 6,311,164 | B1 * | 10/2001 | Ogden | 705/1 |
| 6,341,267 | B1 * | 1/2002 | Taub | 705/11 |
| 6,385,620 | B1 * | 5/2002 | Kurzius et al. | 707/104.1 |
| 6,431,875 | B1 * | 8/2002 | Elliott et al. | 434/322 |
| 6,607,389 | B2 * | 8/2003 | Genevie | 434/235 |
| 6,618,734 | B1 * | 9/2003 | Williams et al. | 707/102 |
| 2002/0029159 | A1 * | 3/2002 | Longden | 705/7 |

OTHER PUBLICATIONS

Collins, Judith, White collar criminality: a prediction model, Iowa State University, 1991, Dialog 01217947/9.*

Terpstra, David, HRM: A key to competitiveness, Management Decision, v32n9, pp. 10-14, 1994, Dialog 00972518/9.*

Integrity Testing as part of hiring process helps weed out potential bad apples, Physician Manager, v8n4, Feb. 28, 1997, Dialog 03473163/9.*

Kamp, John, Thomas, Krause, Selecting Safe employees: A behavioral science perspective, Professional Safety, v42n4, Apr. 1997, pp. 24-28, Dialog 01412860/9.*

Solomonson, Andrew Lawrence, Development and evaluation of a contruct oriented biodata measure for predicting positive and negative contextual performance, University of Georgia, 1999, Dialog 01750825/9.*

Sarchione et al. (Sarchione, Charles D., Michael J. Cuttler, Paul M. Muchinsky, and Rosemary O. Nelson-Gray, "Prediction of Dysfunctional Job Behaviors Among Law Enforcement Officers", Journal of Applied Psychology, vol. 83, No. 6, pp. 904-912, 1998).*

Sarchione et al. (Sarchione, Charles D., Michael J. Cuttler, Paul M. Muchinsky, and Rosemary O. Nelson-Gray, "Prediction of Dysfunctional Job Behaviors Among Law Enforcement officers", Journal of Applied Psychology, vol. 83, No. 6, pp. 904-912, 1998).*

Sarchione, Cuttler, Muchinsky & Nelson, "Prediction of Dysfunctional Job Behaviors Among Law Enforcement Officers," Dec. 1998.

* cited by examiner

```
-<AbstractEvent>
    <ShowWhen/>
    <EventCode/>
    <Name/>
   -<Frequency>
       <Freq/>
       <FreqType/>
    </Frequency>
   -<TimeFrame>
      <BeginDate/>
      <EndDate/>
    </TimeFrame>
   -<Geog>
      <Address/>
      <City/>
      <State/>
      <Zip/>
      <County/>
      <Country/>
    </Geog>
    <OriginDateOffset>rv("GeneralInfo","DOB")</OriginDateOffset>
 </AbstractEvent>
```

FIG. 2

```
-<CriminalEvent>
  -<AbstractEvent>
     <ShowWhen/>
     <EventCode/>
     <Name/>
    -<Frequency>
        <Freq/>
        <FreqType/>
     </Frequency>
    -<TimeFrame>
        <BeginDate/>
        <EndDate/>
     </TimeFrame>
    -<Geog>
        <Address/>
        <City/>
        <State/>
        <Zip/>
        <County/>
        <Country/>
     </Geog>
     <OriginDateOffset>rv("GeneralInfo","DOB")</OriginDateOffset>
  </AbstractEvent>
  <Disposition />
  <Description />
  <SubEvents />
</CriminalEvent>
```

FIG. 3

```xml
-<DisciplineEvent>
  -<AbstractEvent>
    <ShowWhen/>
    <EventCode/>
    <Name/>
    -<Frequency>
       <Freq/>
       <FreqType/>
     </Frequency>
    -<TimeFrame>
       <BeginDate/>
       <EndDate/>
     </TimeFrame>
    -<Geog>
       <Address/>
       <City/>
       <State/>
       <Zip/>
       <County/>
       <Country/>
     </Geog>
     <OriginDateOffset>rv("GeneralInfo","DOB")</OriginDateOffset>
  </AbstractEvent>
  <Description />
</DisciplineEvent>
```

FIG. 4

```
-<EducationEvent>
  -<AbstractEvent>
    <ShowWhen/>
    <EventCode/>
    <Name/>
    -<Frequency>
        <Freq/>
        <FreqType/>
    </Frequency>
    -<TimeFrame>
        <BeginDate/>
        <EndDate/>
    </TimeFrame>
    -<Geog>
        <Address/>
        <City/>
        <State/>
        <Zip/>
        <County/>
        <Country/>
    </Geog>
    <OriginDateOffset>rv("GeneralInfo","DOB")</OriginDateOffset>
  </AbstractEvent>
  <School />
  <Program />
  <DegreeName />
  <ReceivedDegree />
  <CreditHours />
  <CreditHourType />
  <SubEvents />
</EducationEvent>
```

FIG. 5

```
-<EmploymentEvent>
  -<AbstractEvent>
    <ShowWhen/>
    <EventCode/>
    <Name/>
   -<Frequency>
       <Freq/>
       <FreqType/>
    </Frequency>
   -<TimeFrame>
       <BeginDate/>
       <EndDate/>
    </TimeFrame>
   -<Geog>
       <Address/>
       <City/>
       <State/>
       <Zip/>
       <County/>
       <Country/>
    </Geog>
    <OriginDateOffset>rv("GeneralInfo","DOB")</OriginDateOffset>
  </AbstractEvent>
  <Employer />
  <JobTitle />
  <Duties />
  <StartSalary />
  <EndSalary />
  <HoursPerWeek />
  <PositionType />
  <EmployerPhone />
  <Supervisor />
  <LawEnforcement />
  <ReasonForLeaving />
  <SubEvents />
</EmploymentEvent>
```

*FIG. 6*

```
-<FamilyEvent>
  -<AbstractEvent>
      <ShowWhen/>
      <EventCode/>
      <Name/>
    -<Frequency>
        <Freq/>
        <FreqType/>
      </Frequency>
    -<TimeFrame>
        <BeginDate/>
        <EndDate/>
      </TimeFrame>
    -<Geog>
        <Address/>
        <City/>
        <State/>
        <Zip/>
        <County/>
        <Country/>
      </Geog>
      <OriginDateOffset>rv("GeneralInfo","DOB")</OriginDateOffset>
    </AbstractEvent>
</FamilyEvent>
```

FIG. 7

```
-<Geog>
    <Address/>
    <City/>
    <State/>
    <Zip/>
    <County/>
    <Country/>
 </Geog>
```

FIG. 8

```
-<MilitaryEvent>
   -<AbstractEvent>
      <ShowWhen/>
      <EventCode/>
      <Name/>
      -<Frequency>
         <Freq/>
         <FreqType/>
      </Frequency>
      -<TimeFrame>
         <BeginDate/>
         <EndDate/>
      </TimeFrame>
      -<Geog>
         <Address/>
         <City/>
         <State/>
         <Zip/>
         <County/>
         <Country/>
      </Geog>
      <OriginDateOffset>rv("GeneralInfo","DOB")</OriginDateOffset>
   </AbstractEvent>
   <Branch/>
   <DutyStatus/>
   <MOS/>
   <RankStatus/>
   <DischargeStatus/>
   <RetirementBenefits/>
   <SubEvents/>
</MilitaryEvent>
```

FIG. 9

```xml
-<NegativeActionEvent>
   -<AbstractEvent>
      <ShowWhen/>
      <EventCode/>
      <Name/>
      -<Frequency>
         <Freq/>
         <FreqType/>
      </Frequency>
      -<TimeFrame>
         <BeginDate/>
         <EndDate/>
      </TimeFrame>
      -<Geog>
         <Address/>
         <City/>
         <State/>
         <Zip/>
         <County/>
         <Country/>
      </Geog>
      <OriginDateOffset>rv("GeneralInfo","DOB")</OriginDateOffset>
   </AbstractEvent>
   -<DisciplineEvent>
      -<AbstractEvent>
         <ShowWhen/>
         <EventCode/>
         <Name/>
         -<Frequency>
            <Freq/>
            <FreqType/>
         </Frequency>
         -<TimeFrame>
            <BeginDate/>
            <EndDate/>
         </TimeFrame>
         -<Geog>
            <Address/>
            <City/>
            <State/>
            <Zip/>
            <County/>
            <Country/>
         </Geog>
         <OriginDateOffset />
      </AbstractEvent>
      <Description />
   </DisciplineEvent>
   <Description />
</NegativeActionEvent>
```

FIG. 10

```xml
-<OtherAgency>
  -<AbstractEvent>
    <ShowWhen/>
    <EventCode/>
    <Name/>
    -<Frequency>
       <Freq/>
       <FreqType/>
    </Frequency>
    -<TimeFrame>
       <BeginDate/>
       <EndDate/>
    </TimeFrame>
    -<Geog>
       <Address/>
       <City/>
       <State/>
       <Zip/>
       <County/>
       <Country/>
    </Geog>
    <OriginDateOffset>rv("GeneralInfo","DOB")</OriginDateOffset>
  </AbstractEvent>
  <WasEmployed/>
  <WasOffered/>
  <WasWithDrawn/>
  <RejectedOffer/>
  <Describe/>
  <NotSelectedFromList/>
  <NotSelectedFromListDescribe/>
  <DeniedCuzBackground/>
  <DeniedCuzBackgroundDescribe/>
  <DeniedCuzPoly/>
  <DeniedCuzPolyDescribe/>
  <DeniedCuzOral/>
  <DeniedCuzOralDescribe/>
  <DeniedAfterConditional/>
  <DeniedAfterConditionalDescribe/>
</OtherAgency>
```

FIG. 11

```xml
-<SubstanceUseEvent>
  -<AbstractEvent>
    <ShowWhen/>
    <EventCode/>
    <Name/>
    -<Frequency>
      <Freq/>
      <FreqType/>
    </Frequency>
    -<TimeFrame>
      <BeginDate/>
      <EndDate/>
    </TimeFrame>
    -<Geog>
      <Address/>
      <City/>
      <State/>
      <Zip/>
      <County/>
      <Country/>
    </Geog>
    <OriginDateOffset>rv("GeneralInfo","DOB")</OriginDateOffset>
  </AbstractEvent>
  <NumberOfTimes/>
  <NumberOfTimes12Months/>
  <Description/>
  -<SubEvents>
    -<NegativeActionEvent>
      -<AbstractEvent>
        <ShowWhen/>
        <EventCode/>
        <Name/>
        -<Frequency>
          <Freq/>
          <FreqType/>
        </Frequency>
        -<TimeFrame>
          <BeginDate/>
          <EndDate/>
        </TimeFrame>
        -<Geog>
          <Address/>
          <City/>
          <State/>
          <Zip/>
          <County/>
          <Country/>
        </Geog>
        <OriginDateOffset>rv("GeneralInfo","DOB")</OriginDateOffset>
      </AbstractEvent>
      <Description/>
    </NegativeActionEvent>
```

FIG. 12A

```
-<NegativeActionEvent>
   -<AbstractEvent>
      <ShowWhen/>
      <EventCode/>
      <Name/>
     -<Frequency>
         <Freq/>
         <FreqType/>
      </Frequency>
     -<TimeFrame>
         <BeginDate/>
         <EndDate/>
      </TimeFrame>
     -<Geog>
         <Address/>
         <City/>
         <State/>
         <Zip/>
         <County/>
         <Country/>
      </Geog>
      <OriginDateOffset>rv("GeneralInfo","DOB")</OriginDateOffset>
   </AbstractEvent>
   <Description/>
</NegativeActionEvent>
-<NegativeActionEvent>
   -<AbstractEvent>
      <ShowWhen/>
      <EventCode/>
      <Name/>
     -<Frequency>
         <Freq/>
         <FreqType/>
      </Frequency>
     -<TimeFrame>
         <BeginDate/>
         <EndDate/>
      </TimeFrame>
     -<Geog>
         <Address/>
         <City/>
         <State/>
         <Zip/>
         <County/>
         <Country/>
      </Geog>
      <OriginDateOffset>rv("GeneralInfo","DOB")</OriginDateOffset>
   </AbstractEvent>
   <Description/>
</NegativeActionEvent>
-<DisciplineEvent>
   -<AbstractEvent>
```

FIG. 12B

```xml
<ShowWhen/>
<EventCode/>
<Name/>
-<Frequency>
    <Freq/>
    <FreqType/>
</Frequency>
-<TimeFrame>
    <BeginDate/>
    <EndDate/>
</TimeFrame>
-<Geog>
    <Address/>
    <City/>
    <State/>
    <Zip/>
    <County/>
    <Country/>
</Geog>
<OriginDateOffset>rv("GeneralInfo","DOB")</OriginDateOffset>
</AbstractEvent>
<Description/>
</DisciplineEvent>
-<DisciplineEvent>
-<AbstractEvent>
    <ShowWhen/>
    <EventCode/>
    <Name/>
    -<Frequency>
        <Freq/>
        <FreqType/>
    </Frequency>
    -<TimeFrame>
        <BeginDate/>
        <EndDate/>
    </TimeFrame>
    -<Geog>
        <Address/>
        <City/>
        <State/>
        <Zip/>
        <County/>
        <Country/>
    </Geog>
    <OriginDateOffset>rv("GeneralInfo","DOB")</OriginDateOffset>
</AbstractEvent>    <Description/>
</DisciplineEvent>
</SubEvents>
</SubstanceUseEvent>
```

FIG. 12C

```
-<CriticalItem>
    <ShowWhen/>
    <CriticalItemCode>VerballyCounseled</CriticalItemCode>
    <Name/>
    <Value/>
    <MaxValue/>
 -<TimeFrame>
      <BeginDate/>
      <EndDate/>
    </TimeFrame>
 -<Frequency>
      <Freq/>
      <FreqType/>
    </Frequency>
    <Position/>
    <Section/>
    <Classification/>
    <Describe/>
    <IsBioData/>
</CriticalItem>
```

FIG. 13

Background Investigator's Report for:

Name: John Q. Doe
Social Security #: 123456789
Case ID: 441
Case Date: 8/3/00
Report Date: 8/4/00

| Section Question | Response |
|---|---|
| 1) Identifying Information | |
| Last Name | Doe |
| First Name | John |
| Middle Initial Q | Q |
| Social Security Number | 123456789 |
| Retype Social Security Number to confirm | 123456789 |
| Date of Birth | 9/10/1974 |
| Please select your Race/Ethnicity | White |
| Sex | Male |
| 2) Illinois State Police (required information) | |
| Citizenship acquired by: | Birth |
| Height: | 5'10" |
| Weight: | 170 |
| List all other names you have gone by, including nicknames. If female, furnish maiden name: | Johnny, Jack |
| Have you ever legally changed your name? | no |
| Number of Dependents: | 1 |
| Have you ever been issued a drivers license by a state other than Illinois? | YES |
| List state(s) and license number(s): | North Carolina #123456 |
| Father's name: | Ralph Doe |
| Father's address: | 123 Placename Drive, Township, Idaho |
| Father's date of birth: | 4/3/1954 |
| Is your father still living? | YES |
| Mother's name: | Elizabeth Doe |
| Mother's address: | 123 Placename Drive Township, Idaho |
| Mother's date of birth: | 9/10/1954 |
| Is your mother still living? | YES |

FIG. 15A

| | |
|---|---|
| Do you have any brothers? | YES |
| Brother's name: | Lloyd Doe |
| Brother's address: | 44 Flightpath Lane Detroit, Michigan |
| Brother's date of birth: | 5/21/1976 |
| Is this brother still living? | YES |
| Do you have any other brothers? | YES |
| Brother's name: | David Doe |
| Brother's address: | 88 Frenchtown Avenue Burlington, Iowa |
| Brother's date of birth: | 10/3/1980 |
| Is this brother still living? | YES |
| Do you have any other brothers? | no |
| Do you have any sisters? | no |
| Are you currently married? | YES |
| Spouse's name: | Michelle Doe |
| Spouse's address: | 3 Lois Place Ann Arbor, Michigan |
| Spouse's date of birth: | 4/7/1975 |
| Have you been previously married? | no |
| Is there any other person not listed above with whom you currently reside who is currently 16 years of age or older? | no |
| Date began residing there: | 5/1/1996 |
| Complete address: | 6304 Catpaw Drive Greensboro, NC 27403 |
| Do you rent? | YES |
| Landlord's name: | Richland Properties |
| Landlord's complete address: | 55 Lords Avenue Chapel Hill, NC |
| Landlord's telephone number: | 919-345-6789 |
| Began residence: | 1/1/1975 |
| Ended residence: | 5/1/1996 |
| Complete address: | 134 State Street Brooklyn Heights, Ohio |
| Did you rent? | no |
| Name of first reference: | Harold Cobleman |
| Complete address: | 23 Grant Drive Raleigh, NC |
| Telephone number: | 919-222-9876 |
| Name of second reference: | Michael Easterling |
| Complete address: | 88 Governor Lane Chapel Hill, NC |
| Telephone number: | 919-887-6627 |
| Name of third reference: | James Hunter |
| Complete address: | 9943 Wilson Street Springfiled, Illinois |
| Telephone number: | 217-567-2941 |
| Name: | Randal Bircham |
| Complete address: | 56 Heltring Street Greensboro, NC |
| Telephone number: | 336-288-7941 |

FIG. 15B

| | |
|---|---|
| Have you previously submitted an application for employment as a sworn officer with the Illinois State Police? | YES |
| Approximately when did you apply? | 9/1997 |

3) Education

3.1) Overview

| | |
|---|---|
| Education beyond high school/GED | YES |
| Law Enforcement Training | YES |
| Academic, i.e. College | YES |
| Bachelor Degree(s) | YES |

3.3) Academic Bachelor Degrees

| | |
|---|---|
| Bachelor of Arts | YES |
| Please select your major field of study: | Social Sciences, |
| What was the name of the Institution? | New York University |
| Did You Receive your Degree? | YES |
| Date of Graduation: | 5/1998 |

3.6) Vocational Police and Law

| | |
|---|---|
| Police Academy | YES |
| Institution/Agency: | Guilford technical Community Colleg |
| State: | NC |
| Date completed: | 7/1998 |
| Are you currently a certified law enforcement officer? | YES |

4) Employment History

| | |
|---|---|
| When did you first decide to pursue a job in law enforcement, criminal justice or public safety? | 1/1989 |
| What is the date of your first application to any law enforcement, criminal justice, or public safety agency? | 5/1998 |
| Are you currently employed on a full time basis? | YES |
| Have you ever been unemployed for more than 30 days? | YES |
| If you answered "Yes," how many times? | 1 |
| Please provide BEGIN date for | 5/1998 |

FIG. 15C

LAST period of unemployment:
Please provide END date for          7/1998
LAST period of unemployment:
Use this space to describe your      After I graduated from college, I took a couple of months off
periods of unemployment:             so that I could travel to Europe

4.1) Position 1 - Herman, Stokes, Calwell, and Bounce

4.1.1) General Information

Employer:                            Herman, Stokes, Calwell, and Bounce
Job Title:                           paralegal
Duties:                              I perform clerical and paralegal duties for this law firm
Is/was this job:                     Full-time
Starting Salary/Wage/Average         $9.00
Commission:
Per:                                 Hour
Ending (or Current)                  $10.50
Salary/Wage/Average
Commission:
Per:                                 Hour
Employer address:                    545 Madison Avenue Greensboro, NC
Telephone number:                    336-654-0600
Supervisor's name:                   Don Mclean
Date Hired:                          9/1999
Still employed?                      YES

4.1.2) Performance/Disciplinary Incidents

I experienced and/or was             YES
counseled for policy or work rules
violations.
Please explain:                      I accidentally damaged a computer terminal by spilling coffee
                                     on it.
I experienced and/or was             YES
counseled for attendance
problems. (schedule conflict)

Please explain:                      I was late to work on three occasions in April, 2000 due to
                                     child care difficulties

4.2) Position 2 - Anytown Police Department
4.2.1) General Information

Employer:                            Anytown Police Department
Job Title:                           Police Officer
Duties:                              regular law enforcement duties of a police officer.
Is/was this job:                     Full-time
Starting Salary/Wage/Average         $25000
Commission:

*FIG. 15D*

| | |
|---|---|
| Per: | Year |
| Ending (or Current) Salary/Wage/Average Commission: | $25000 |
| Per: | Year |
| Employer address: | 35 Government Plaza Anytown, Missouri |
| Telephone number: | 226-334-0900 |
| Supervisor's name: | John McCann |
| Date Hired: | 7/1998 |
| Still employed? | no |
| If not still employed, when did you leave? | 10/1998 |
| Which of the following best describes the circumstances under which you left employment at this position? | Terminated during probationary period, |
| Please describe the details of all the circumstances you have marked above | Terminated due to difficulty adjusting to shift schedules. |

4.2.2) Performance/Disciplinary Incidents

| | |
|---|---|
| I experienced and/or was counseled for policy or work rules violations. | YES |
| Please explain: | On duty auto accident subsequent to a vehicle chase |
| I was reassigned and/or counseled due to poor fit with job. | YES |
| Please explain: | I had difficulty adjusting to the shift schedules |
| I experienced disagreement(s) with management. | YES |
| Please explain: | I was assigned to a field training officer who continually expected me to do his paperwork for him. He continually sat in the car and made me answer calls alone. When I complained, he wrote me up for insubordination |
| I was accused of dishonesty. | YES |
| Please explain: | My supervisor accused me of lying to him about some evidence that was missing (and was later found). He thought that I knew where it was all along. |
| Co-worker complaints | YES |
| I was verbally counseled: | YES |
| Number of times: | 2 |
| Date of last incident: | 9/1998 |
| Please explain: | Someone on my squad kept telling jokes that offended me. I asked him to stop, and he refused. We got into an argument and the supervisor counseled both of us. |

4.3) Kinko's

*FIG. 15E*

4.3.1) General Information

| | |
|---|---|
| Employer: | Kinko's |
| Job Title: | Associate |
| Duties: | responsible for customer service, production of printed documents, and general assistance |
| Is/was this job: | Part-time |
| Indicate average number of hours per week: | 15 |
| Starting Salary/Wage/Average Commission: | $6 |
| Per: | Hour |
| Ending (or Current) Salary/Wage/Average Commission: | $8.50 |
| Per: | Hour |
| Employer address: | 33 Mountain Court Asheville, NC |
| Telephone number: | 828-903-1267 |
| Supervisor's name: | John Giddings |
| Date Hired: | 6/1996 |
| Still employed? | no |
| If not still employed, when did you leave? | 5/1998 |
| Which of the following best describes the circumstances under which you left employment at this position? | Career advancement, |
| Please describe the details of all the circumstances you have marked above | I worked at this part time job all through college. I resigned when I graduated |

4.3.2) Performance/Disciplinary Incidents

| | |
|---|---|
| I experienced disagreement(s) with management. | YES |
| Please explain: | I had many managers and supervisors over the years that I worked here and got along with most of them. One of them continually used terrible language that offended me. I asked him to stop and he refused. |

5) Military History

| | |
|---|---|
| Have you EVER served in the military on active duty OR reserve duty? | YES |

5.1) 1st Service
5.1.1) General Information

| | |
|---|---|
| Branch of Service: | USAR or ARNG |
| Duty Status: | Active Reserve |

FIG. 15F

Primary job or MOS: personnel specialist
Enlisted YES
E: 5
Date Initially Enlisted or Commissioned: 3/1994
Discharge Status: Honorable
Date Discharged, Retired, or Assigned to Reserves: 3/2000
Did your discharge occur prior to full expiration of original or anticipated term of enlistment? no

5.1.2) Disciplinary History

Article 15/Captain's Mast YES
Number of times: 1
Date of last infraction: 10/1995
Describe EACH infraction: recieved an article 15 for missing a drill
Forfeiture of Pay YES
Frequency: Once
Reduction in Rank YES
Frequency: Once
Rank BEFORE last discipline: E 4

Rank AFTER last discipline: E 3

6) Marital Status/Family Information

Current Marital Status: Married
Date of Marriage: 6/16/1997
Number of Previous Marriages: 0
With whom are you currently living? Spouse
Are you currently financially responsible for dependent children who do NOT live with you? no

7) Legal
7.1) Traffic Violations

Moving violation(s) YES
Number of violations: 5
Date of last incident: 1/2000
Describe and/or provide additional information regarding this/these violation(s): I have had 5 speeding tickets. The last one occured in January, 2000 while I was driving to work

*FIG. 15G*

| | |
|---|---|
| Accident(s) with property damage only | YES |
| Number of accidents: | 2 |
| Date of last incident: | 2/2000 |
| Describe and/or provide additional information regarding this/these violation(s): | I have had 2 accidents. The last one occured in February, 2000. The roads were very icy and I was unable to stop at a stoplight. I proceeded into the intersection and struck a parked car. |

7.2) Integrity, etc.

| | |
|---|---|
| Have you ever been a defendant, plaintiff, respondent in a civil court action(s)? | no |
| Have you ever taken ANY money or property from an employer? | YES |
| Total number of times: | 3 |
| Taken $0-$50 in money or property | YES |
| Number of times: | 2 |
| Date of LAST incidence of employee theft: | 7/2000 |
| Please describe these acts. | I took some pens and a stapler home from work |
| Taken $100-$500 in money or property | YES |
| Number of times: | 1 |
| Date of LAST incidence of employee theft: | 11/1998 |
| Please describe these acts. | When I was a police officer, I accidentally failed to turn in a small bag of marijuana that I had obtained from a subject I arrested. |
| Have you ever taken, bought, sold, received or held stolen property for someone else? | no |

7.3) Criminal Offenses
7.3.1) Criminal Dispositions, Sentences, and/or Outcomes

| | |
|---|---|
| Have you ever been arrested, detained, pled guilty or no contest to a charge involving assault or domestic violence? | no |
| Have you ever been incarcerated? | no |
| Have you ever been on probation or parole? | no |
| Have you ever been sentenced to community service? | no |
| Have you ever been ordered to make restitution? | no |

*FIG. 15H*

| | |
|---|---|
| Have you ever been mandated to counseling or education? | no |

7.3.2) Reported Criminal Offenses

| | |
|---|---|
| Any drug or alcohol related offense | YES |
| Number of times: | 1 |
| Date of LAST infraction: | 5/1992 |
| Disposition of last infraction: | Convicted |
| Description of ALL infractions: | Possession of alchohol as a minor. I was in Myrtle Beach with a bunch of my friends and we were at a party having some beer. |
| Property damage/vandalism | YES |
| Number of times: | 1 |
| Date of LAST infraction: | 3/1987 |
| Disposition of last infraction: | Prayer for Judgement Continued |
| Description of ALL infractions: | When I was 13 years old, a couple of us tipped over some mail boxes |
| DUI/DWI | YES |
| Number of times: | 1 |
| Date of LAST infraction: | 5/2000 |
| Disposition of last infraction: | Convicted of a lesser charge |
| Description of ALL infractions: | I was stopped by a state trooper while driving home from a party. I consented to a breath test and blew .05 (under the limit.)I then pled guilty to carrying an open container of alchol in my vehicle. |

8) Substance Use
8.1) Tobacco and Alcohol

| | |
|---|---|
| Do you smoke now? | no |
| Do you currently drink alcohol? | YES |
| How many times have you consumed 6 or more drinks at a time? | 5 |
| How often have you driven after 4 or more drinks? | 7 |
| How many times have you driven with an open container? | 2 |
| What is the average number of drinks consumed per week? | 9 |
| How many times have you consumed alcohol on the job? | 0 |
| How many times have you been warned by an employer about drinking? | 0 |

8.2) Illegal Drug Use

*FIG. 15I*

8.2.1) Overview

| | |
|---|---|
| Have you ever used or experimented with marijuana? | YES |
| Have you ever used or experimented with cocaine? | YES |
| Have you ever used or experimented with amphetamines, methedrine, dexedrine, "speed"? | no |
| Have you ever used or experimented with PCP (angel dust)? | no |
| Have you ever used or experimented with crack cocaine, opiates, morphine, heroin? | no |
| Have you ever used or experimented with hallucinogens? | no |
| Have you used or experimented with any illegal drug not listed above? | no |
| Have you illegally used or experimented with any other drugs? | YES |

8.2.2) Marijuana

| | |
|---|---|
| Number of times you have smoked/used or experimented with marijuana in your entire life: | More than 30 |
| Number of times that you have smoked/used or experimented with marijuana in the last 12 months: | 0 |
| Have you ever driven after smoking/using marijuana? | YES |
| Date of last incident: | 3/1994 |
| Explain: | I drove home from a party in college after smoking marijuana |
| Have you ever provided marijuana in exchange for money or goods? | no |
| Have you ever grown, cultivated, or been involved in the manufacture of marijuana? | no |
| Have you ever been refused employment or military service because of use of marijuana? | no |
| Have you ever been disciplined or discharged from employment or military service because of use of marijuana? | no |
| Age FIRST used or experimented | 15 |

FIG. 15J

| | |
|---|---|
| with Marijuana: | |
| Date last used or experimented with Marijuana: | 3/1998 |
| You may use this space to provide additional information about your marijuana use. | I smoked marijuana while I was in college but have not done so since graduating |

8.2.3) Cocaine

| | |
|---|---|
| Number of times that you have used or experimented with cocaine: | 1-5 |
| Number of times that you have used or experimented with cocaine in the past 12 months: | 0 |
| Have you ever driven after using cocaine? | no |
| Have you ever provided cocaine in exchange for money or goods? | no |
| Have you ever grown, cultivated, or been involved in the manufacture of cocaine? | no |
| Have you ever been refused employment or military service because of use of cocaine? | no |
| Have you ever been disciplined or discharged from employment or military service because of use of cocaine? | no |
| Age FIRST used or experimented with Cocaine: | 19 |
| Date Last used or experimented with Cocaine: | 6/1998 |
| You may use this space to provide additional information about your cocaine use. | I used cocaine twice. Once when I was a freshman in college and once right after I graduated. I have no intention of continuing to use this drug |

8.2.8) Other Drug Use

| | |
|---|---|
| Have you used or experimented with any illegal drug not previously listed? | no |
| Have you illegally used or experimented with any other drugs? | YES |
| Number of times: | 2 or 3 |
| Name/type of prescription drug(s): | valium |
| Explain: | I had a girlfriend who had a perscription for valium. She gave me one a couple of times. |
| Use this space to describe, explain, or add any information you think is important regarding | Although I have used drugs in the past, I have not used any since graduating from college. I have now "grown up" and I certainly don't intent to use them in the future. |

FIG. 15K your substance use.

9) Applications to Other Agencies

Have you previously applied to any law enforcement agency?     YES

9.1) Agency 1

| | |
|---|---|
| Agency name: | Illinois State Police |
| City: | Springfield |
| State: | Illinois |
| Date applied: | 6/2000 |
| Were you employed by this agency? | no |
| Were you offered employment with this agency? | no |
| Not selected from eligibility list. | YES |
| Explain: | I just applied a few weeks ago and they have not, as yet, processed my application |
| Have you applied to any other law enforcement agencies? | YES |

9.2) Agency 2

| | |
|---|---|
| Agency name: | Nashville Police Department |
| City: | Nashville |
| State: | Tennessee |
| Date applied: | 7/1997 |
| Were you employed by this agency? | no |
| Were you offered employment with this agency? | no |
| Denied due to results, information, and/or issues developed through background investigation. | YES |
| Explain: | Disqualified because of my use of cocaine |
| Have you applied to any other law enforcement agencies? | no |

10) Other Legal

| | |
|---|---|
| Have you ever intentionally or unintentionally slapped, punched or otherwise injured a spouse or domestic partner? | no |
| Have you ever been served with or been the subject of a domestic restraining order | no |
| Have you ever cheated, lied, or misrepresented facts during an | no |

FIG. 15L application or employment
evaluation process?

© Copyright 1999, 2000 LESI®

FIG. 15M

Life Events for John Q. Doe

| # | Name | Begin | End | Freq |
|---|------|-------|-----|------|

Education Events (section 3)

<u>1)</u> Bachelor of Arts     5/1998
<u>2)</u> Police Academy     7/1998

Employment History Events (section 4)

<u>3)</u> First decided to pursue a job in law enforcement, criminal justice or public safety     1/1989     1/1989

<u>4)</u> First applied to any law enforcement, criminal justice or public safety agency     5/1998     5/1998

<u>5)</u> Unemployed for more than 30 days     5/1998     7/1998     1 times

<u>6)</u> Position 1 - Herman, Stokes, Calwell, and Bounce     9/1999
    I experienced and/or was counseled for policy or work rules violations.
    I experienced and/or was counseled for attendance problems. (schedule conflict)

<u>7)</u> Position 2 - Anytown Police Department     7/1998     10/1998
    I experienced and/or was counseled for policy or work rules violations.
    I was reassigned and/or counseled due to poor fit with job.
    I experienced disagreement(s) with management.
    I was accused of dishonesty.
    Co-worker complaints
        I was verbally counseled:     9/1998     9/1998     2 times
        On Duty Motor Vehicle Accidents             10/1998     1 incidents
        Letters of Reprimand             10/1998     1 incidents
        Suspension WITH pay 3-10 days             12/1998     1 incidents <u>8)</u> Position 3 - Kinko's     6/1996     5/1998
    I experienced disagreement(s) with management.

Military History Events (section 5)

<u>9)</u> USAR or ARNG     3/1994     3/2000
    Article 15/Captain's Mast     10/1995     10/1995     1 time(s)
    Forfeiture of Pay             Once time(s)
    Reduction in Rank             Once time(s)

Marital Status And Family Information Events (section 6)

*FIG. 17A*

10) Marital Status: Married     6/1997     1 times

Traffic Violation Events (section 7.1)
11) Moving violation(s)     1/2000     5 time(s)
12) Accident(s) with property damage only     2/2000     2 time(s)

Integrity Events (section 7.2)
13) Have you ever taken ANY money or property from an employer?     3 time(s)
14) Taken $0-$50 in money or property     7/2000     2 time(s)
15) Taken $100-$500 in money or property     11/1998     1 time(s)

Criminal Events (section 7.3)
16) Any drug or alcohol related offense     5/1992     1 time(s)
17) Property damage/vandalism     3/1987     1 time(s)
18) DUI/DWI     5/2000     1 time(s)

Substance Use Events (section 8)
19) Alcohol     9 per week
    How many times have you consumed 6 or more drinks at a time?     5 time(s)
    How often have you driven after 4 or more drinks?     7 time(s)
20) Marijuana     9/1989     3/1998     More than 30 time(s)
    Have you ever driven after smoking/using marijuana?     3/1994     3/1994
21) Cocaine     9/1993     6/1998     1-5 time(s)
22) Other Illegal Drugs     2 or 3 time(s)

Applications To Other Agencies Events (section 9)
23) Applied to Illinois State Police     6/2000     6/2000
24) Applied to Nashville Police Department     7/1997     7/1997

© Copyright 1999, 2000 LESI®

FIG. 17B

Critical Items for John Q. Doe — 90

The following items have been directly linked through research to disciplinary action in law enforcement officers.

Show Risk Scores? (Yes) No

| Name — 900 | Begin (Age) — 902 | End (Age) — 904 | Freq — 906 | Detail — 908 | 910 — Value |
|---|---|---|---|---|---|
| Minor Discipline Problems | | | | Position 1 - Herman, Stokes, Calwell, and Bounce, Position 3 - Kinko's | 2 |
| Major Discipline Problems in 1 job | | | 1 jobs | Position 2 - Anytown Police Department, | 2 |
| Terminated or resigned by mutual agreement once | | | 1 times | Position 2 - Anytown Police Department, | 2 |
| Reduction in Rank | | | Once time (s) | USAR or ARNG | 3 |
| Has used Marijuana more than 30 times | 9/1989 (Age 15) | 3/1998 (Age 24) | More than 30 time(s) | Marijuana | 2 |
| Used Cocaine within 2 years (2 years) | 9/1993 (Age 19) | 6/1998 (Age 24) | 1-5 time(s) | Cocaine | 4 |
| Failed to indicate last date of drug use Other Illegal Drugs | | | 2 or 3 time (s) | Other Illegal Drugs | 1 |
| Used hard drugs as adolescent or cocaine before the age of 25 (at 24 years old) | 6/1998 (Age 24) | 6/1998 (Age 24) | 2 or 3 time (s) | | 3 |
| Drug use after graduating with a criminal justice degree or applying to a Law | 9/1993 | 6/1998 | | Cocaine | 3 |

FIG. 19a

| Enforcement Position | | | | |
|---|---|---|---|---|
| Denied employment because of background check | (Age 19) | 7/1997 (Age 23) | 7/1997 (Age 23) | Applied to Nashville Police Department | 2 |

Total 24

Other Negative Indicators for John Q. Doe

The items below are negative background indicators recommended for follow up by investigators.

| Name | Begin (Age) | End (Age) | Freq | Detail |
|---|---|---|---|---|
| I was verbally counseled: (coworker) | 9/1998 (Age 24) | 9/1998 (Age 24) | 2 times | Position 2 - Anytown Police Department |
| On Duty Motor Vehicle Accidents | | 10/1998 (Age 24) | 1 incidents | Position 2 - Anytown Police Department |
| Letters of Reprimand | | 10/1998 (Age 24) | 1 incidents | Position 2 - Anytown Police Department |
| Failed to provide 10 years of job history (4 years provided) | 6/1996 (Age 22) | 8/2000 (Age 26) | 1 times | |
| Drug use within 120 days of first application to a law enforcement position | | 6/1998 (Age 24) | | Marijuana, Cocaine |

FIG. 19B

BIO DATA SUMMARY FOR JOHN Q. DOE

| 1002 — NAME | 1004 — INDEX | 1006 — RISK SCORE |
|---|---|---|
| EMPLOYMENT INDEX — 1008 | 9 | High |
| CRIMINAL INDEX — 1010 | 0 | Low |
| SUBSTANCE INDEX — 1012 | 13 | High |
| OTHER INDEX — 1014 | 2 | Moderate |
| TOTAL | 24 | HIGH |

1000

© Copyright 1999, 2000 LESI®

FIG. 20

SYSTEM, METHOD AND COMPUTER READABLE MEDIUM FOR ACQUIRING AND ANALYZING PERSONAL HISTORY INFORMATION

The present invention relates to a computer-based system and method for acquiring and analyzing personal history information, particularly, personal history information for an applicant for law enforcement employment, and using the personal history information to predict specific negative job-related outcomes for such an applicant.

BACKGROUND OF THE INVENTION

In the case of "high risk" employment positions (particularly in law enforcement, public safety, and criminal justice professions), personal life history information forms the foundation for a comprehensive background investigation. The results of these investigations typically are used to evaluate the employment suitability of a given candidate. As such, the completion (by the applicant) of an instrument used to gather this history is the first step of most pre-employment background investigations.

The complex personal history information that provides the basis for this background investigation must be organized, exhaustively investigated, and objectively evaluated. However, accurate, efficient and objective evaluation of background information can be difficult to accomplish because the data is lengthy, and the quality of available investigative resources is usually limited since applicant background investigations must, necessarily, receive lower organizational priority than urgent law enforcement investigations. Nonetheless, even when data is well organized, and adequate investigative resources (time, talent, and priority) are invested, it is still difficult to objectively compare and evaluate these findings.

Biodata, as that term is used herein, are specific life events, sometimes referred to as critical items, derived from various personal history domains, such as employment, military, legal and substance use. The biodata for each personal history domain are then assigned numerical values. Scientific research has demonstrated that these values, considered in aggregate, are predictive of specific job dysfunctions in law enforcement officers (e.g. Sarchione, Cuttler, Muchinsky, and Nelson; 1998). Therefore, analyzing personal history data can be an effective means of evaluating applicants for employment. Acquiring this information in an accurate and efficient manner, however, is a tedious and often cumbersome process.

There are several ways to develop biodata from personal history questionnaires. One common way is to develop a series of objective questions ("true/false," "yes/no," multiple choice, and/or range-related questions), and assemble these items in a specific questionnaire that yields biodata scores. This is sometimes referred to as "objective scoring." In contrast, some questionnaires use open-ended questions that require a descriptive answer (for example, "Compared to your peers, how well did you do in school?") that is then scored by a reader. This is sometimes referred to as "subjective scoring." Both approaches, however, have shortcomings in an employment selection setting.

Accurate derivation of biodata from an objectively scored questionnaire is dependent upon the applicant's interpretation of a given question. Because of the applicants' "response set" to negative life events, the applicant may misinterpret the meaning of a question. The term "response set" is a psychometric concept referring to the "attitude" with which an individual completes a test, questionnaire, or screening instrument. It is generally accepted that the "response set" adopted by an employment applicant is reflected in what is called a "positive bias" towards description of life events, particularly if these events are negative. In other words, it is expected that employment applicants will attempt to portray themselves in as positive a light as possible in order to be viewed favorably in the selection process.

For example, an employment applicant might indicate "no" to the question "have you ever been fired, terminated, or asked to leave a job under negative circumstance". However, upon interview he/she may state: "I simply thought it was best to leave after my cash register came up short and the boss held me responsible." In this case a biodata value for "job termination" should be calculated. However, based on the applicant's response to an "objective" questionnaire, it would not be scored. Because of these phenomena, many objectively scored biodata instruments are found to be inaccurate upon interview and/or background investigation and are considered to be reliable only upon confirmation by personal interview. Hence, the utility of such objectively scored personal history questionnaires as an initial screener for large groups of applicants is limited.

Subjective scoring is less obvious to the applicant, and thus, less susceptible to response set biases, and also has the advantage of allowing the evaluator, rather than the applicant, to interpret specific events and assign biodata scoring points. In addition, researchers have typically found high levels of inter rater reliability when biodata is derived in this fashion. Unfortunately, this is also a rather tedious and time-consuming task. The information needed to make the fine distinctions necessary for accurate assignment of biodata values is usually spread out among several pages (sometimes, several volumes) of personal history information, and occasionally important points are overlooked, rendering this approach less practical for large groups of applicants.

In addition, conventional biodata questionnaires have been constructed in a manner similar to psychological tests and, as such, have the same vulnerability to error. These questionnaires are typically designed by identifying psychological constructs, such as cognitive abilities, personality traits, attitudes and values. These psychological constructs are thought to be predictive of job traits for a certain broad class of jobs (e.g., sales), such as conscientiousness, decision-making ability, interpersonal flexibility and empathy. Specific life history questions are then rationally linked by experts to these constructs. The resultant biodata values are then calculated in terms of scores on these constructs. Finally, the individual's suitability is described in terms of the degree to which his/her scores approximates those associated with good or bad job performance within a job classification.

Similar to psychological tests, the accuracy of these job performance predictions (based on psychological construct scores derived from biodata) are dependent on the degree to which the various constructs are predictive of the job-related outcome in question, as well as the degree to which the job in question is similar to the job for which the constructs were identified. Consequently, the accuracy of construct based biodata questionnaires suffers from the same sources of error as psychological tests. In addition, the questionnaire itself must be redesigned each time the critical components of a job change.

Finally, psychological tests, as well as biodata questionnaires linked to psychological constructs have been criticized as intrusive in regard to personal privacy. Many of the specific test items contained in psychological tests have been challenged on the grounds of invasion of privacy. This can also be true when biodata questionnaires are administered separately from a background investigation.

SUMMARY OF THE INVENTION

The present invention provides for a computer-based system and method, and computer software, for acquiring life history information from an applicant for law enforcement, criminal justice or public safety employment to minimize positive response bias and enhance the veracity of the acquired life history information. The life history information is used for conducting a conventional background investigation. The life history information is also used to predict a specific, negative, objective outcome, such as whether the applicant will complete training or whether, if hired, the applicant will receive formal disciplinary action.

A questionnaire engine presents the applicant with a collection of questions to elicit the life history information. Within each question collection, there are revealed stem questions and hidden branch questions. Depending on the applicant's response to the revealed stem question, the hidden branch question is revealed and the applicant's response to the hidden branch question is stored in a computer database. In one embodiment, the applicant cannot alter the stem question response after completion of the question collection.

A rules processing engine, comprised of a life events engine and a critical items engine, uses the life history information to predict an objective, negative job-related outcome. The life history information about the applicant is stored in a computer database. The life events engine determines the existence of a plurality of predefined life events based on the life history information. A critical items engine identifies from the life events one or more negative indicators. A negative indicator is a life event that is linked to a specific, negative, objective job related outcome. The critical items engine also identifies one or more predefined critical items from the negative indicators. A critical item is a negative indicator that has been linked empirically to a specific, negative, job related outcome. Values are then assigned to each critical item, and based on these values, life event type indices are calculated for types of life events. A risk score is then calculated for each of the life event type indices. Finally, a prediction of a negative, objective job-related outcome is based on the risk scores.

These and other advantages and features that characterize the present invention are pointed out with particularity in the claims annexed hereto. For a better understanding of the invention and its advantages, reference should be made to the Drawings and the Detailed Description of the Preferred Embodiments, which also describe the manner of making and using the invention.

BRIEF DESCRIPTION OF THE DRAWINGS

FIG. 2 is a description of the abstract life event data structure.

FIG. 3 is a description of the criminal event data structure.

FIG. 4 is a description of the discipline event data structure.

FIG. 5 is a description of the education event data structure.

FIG. 6 is a description of the employment event data structure.

FIG. 7 is a description of the family event data structure.

FIG. 8 is a description of the general information data structure.

FIG. 9 is a description of the military event data structure.

FIG. 10 is a description of the negative action event data structure.

FIG. 11 is a description of the other agency data structure.

FIGS. 12A-12C, collectively, are a description of the substance use data structure.

FIG. 13 is a description of the critical item data structure.

FIGS. 15A-15M, collectively, are a sample life history information report that is generated by the system and method of the present invention.

FIGS. 17A-17B, collectively, are a sample life events report that is generated by the system and method of the present invention.

FIG. 19 is a sample of the critical items report that is generated by the system and method of the present invention.

FIG. 20 is a sample biodata indices report that is generated by the system and method of the present invention.

DETAILED DESCRIPTION OF THE PREFERRED EMBODIMENTS

Figure 1:
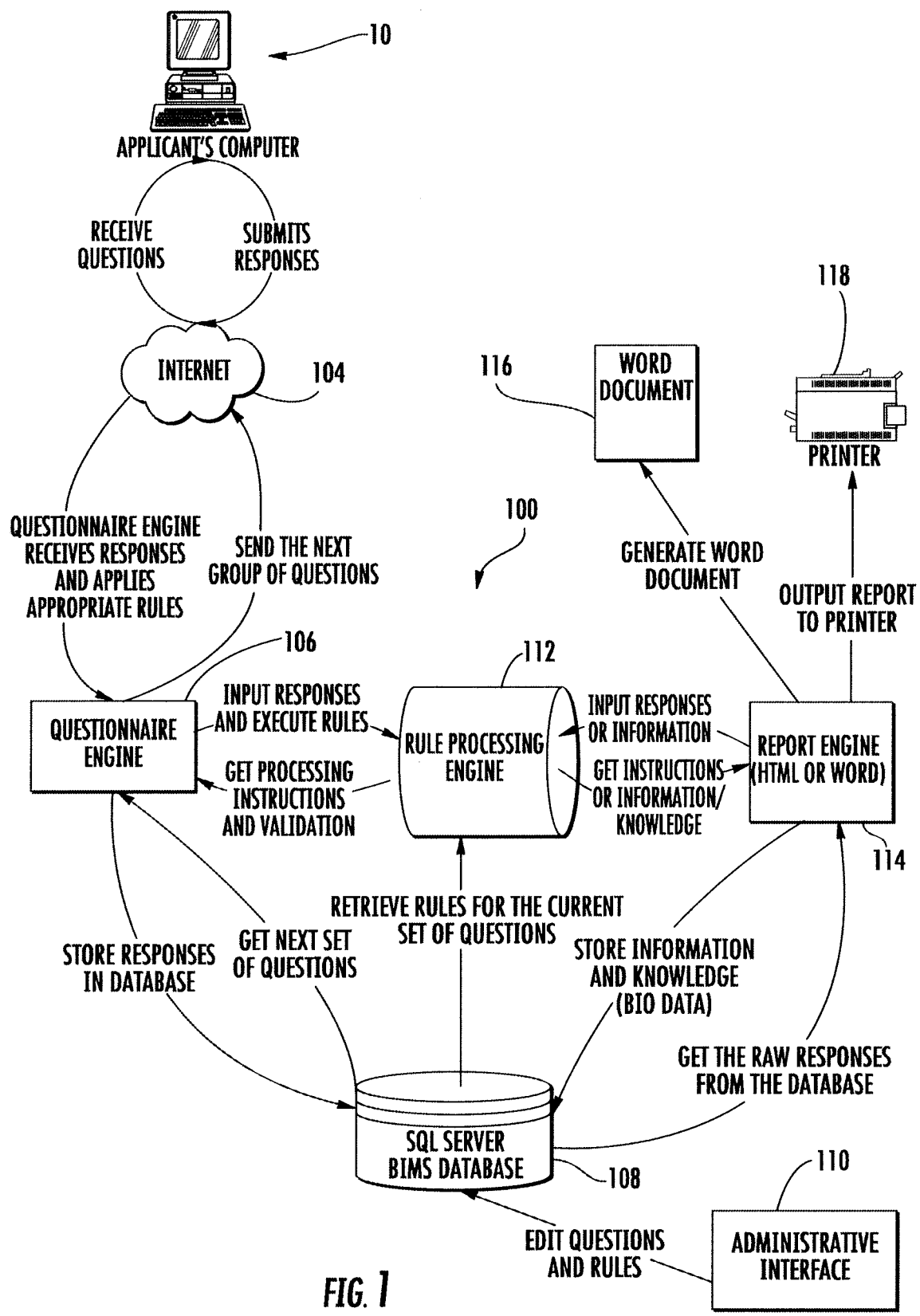
FIG. 1 is a block diagram background information management system of the present invention.

In view of the complexity of the invention, the overall architecture of the invention is first discussed. Next, specific components of the invention, such as the questionnaire engine, the rule processing engine, the life event engine and the critical items engine are considered. Examples of reports generated by the system are also discussed to better illustrate the invention.

In the following description, like reference characters designate like or corresponding parts throughout the several views. It should be understood that the illustrations are for the purpose of describing a preferred embodiment of the invention and are not intended to limit the invention thereto.

Overview

FIG. 1 illustrates the overall architecture of the background information management system 100 of the present invention. In response to input received from the user, a personal computer 102 running a browser requests a set, or cluster, of questions via a communications network 104, such as the Internet. The questions are designed to obtain information about the life history of the user, such as an applicant for a law enforcement position.

A questionnaire engine 106, which is discussed in more detail below, retrieves the requested set of questions from a SQL database 108 and transmits the set of questions to the user via the communications network 104. The set of questions is then displayed on the browser running on the personal computer 102. The personal computer receives the user's responses to one or more of the questions in the set. The responses are sent to the questionnaire engine 106, which sends the responses to the SQL database 1116, where they are stored in association with the questions. Based on the user's responses to a set of questions, the questionnaire engine 106 logically determines which questions or set of questions are next presented to the applicant.

An administrative interface 110 is provided to allow a system administrator to edit the questions stored in the SQL database 108 and the logic for determining the questions to be presented to the user.

A rule processing engine 112 receives question responses from the SQL database 108 and organizes the questions and responses into a life history report.

The rule processing engine 112 also analyzes the questions and answers and establishes a number of life events. A life event is something that occurred during the life of the user.

FIG. 2 illustrates the data structure of an abstract life event. An abstract event is analogous to an abstract base class that represents an event based in time. The functionality of the base class can be extended through inheritance. The attributes of the abstract life event are part of every event since all events are derived from the abstract life event. The abstract event data structure is advantageously designed to represent information for all life events that are created and managed by the system. Each event can have a condition for inclusion (ShowWhen), a frequency, a begin date and end date, and a location.

An abstract life event consists of the following attributes:
ShowWhen—a rule that fires to determine whether the event is relevant. If the ShowWhen attribute evaluates to true, then the event will show itself (or be stored in the database for later viewing).
EventCode—a unique identifier so that the event can be referenced.
Name—is a human friendly name
Frequency—contains two sub attributes
　Freq—is the frequency of the event. For example "has been arrested 2 times," the Freq would be "2"
　FreqType—is the units on the frequency. From the above example the FreqType would be "Times". Other examples are "per week" and "per year".
TimeFrame—contains two sub attributes
　BeginDate—is the begin date of the life event. If this is blank, then there is no begin date or it is unknown or not relevant.
　EndDate—is the end date of the life event. If this is blank, then there is no end date or it is unknown or not relevant.
Geog—contains 6 attributes that define the location geography of the event.
　Address
　City
　State
　Zip
　County
　Country
OriginDateOffset—this sets the origin of the scale of measurement of time events. For a person, this might be their date of birth.

FIGS. 3-12, illustrate the data structures of the following types of life events:
criminal event (FIG. 3)
discipline event (FIG. 4)
education event (FIG. 5)
employment event (FIG. 6)
family event (FIG. 7)
general information (FIG. 8)
military event (FIG. 9)
negative action event (FIG. 10)
other agency (FIG. 11)
substance use (FIGS. 12A-12C)

Returning to FIG. 1, the rule processing engine 112 identifies negative indicators from the life events. In the preferred embodiment, a negative indicator is a life event that is relevant to predicting an outcome for an applicant for law enforcement employment. In the preferred embodiment, a negative indicator can also be a critical item.

A critical item is an event, or a combination of events, the occurrence of which is empirically linked to a possible specific negative outcome, such as, failure to complete training, receipt of a disciplinary action or notification of a performance deficiency. By "disciplinary action," we mean an adverse action taken with respect to any employee, such as, a reprimand, suspension or termination. FIG. 13 illustrates the data structure for a critical item.

In the law enforcement employment screening process, the presence of a negative indicator might warrant further investigation.

The rule processing engine 112 assigns certain predetermined values to the critical items. The values are assigned to the critical items are based on empirical research that correlates the critical item to a specific, objective, negative outcome. Also, the occurrence of one or more critical events might result in not hiring the applicant. Other negative indicators have been "rationally" linked to negative outcomes. In other words, experts agree that, as a matter of reason, such events are related to a particular negative outcome.

The rule processing engine 112 calculates biodata indices based on the values assigned to the critical items. A biodata index can be calculated for each life event type associated with any of the critical items. For example, biodata indices could be computed for the employment, criminal and substance abuse types of life events. The indices can be summed to produce an overall risk score. The higher an applicant's risk score, the lower the applicant's priority with respect to the hiring entity.

A report engine 114 generates reports of the life history information accumulated by the questionnaire engine 104. The report engine 114 also generates a report of life events, critical items and biodata indices. The reports may be formatted into an electronic word processing document 116, such as Microsoft Word®) or Word Perfect®), output to printer 118, or displayed on a computer 102.

The Questionnaire Engine

Figure 14:
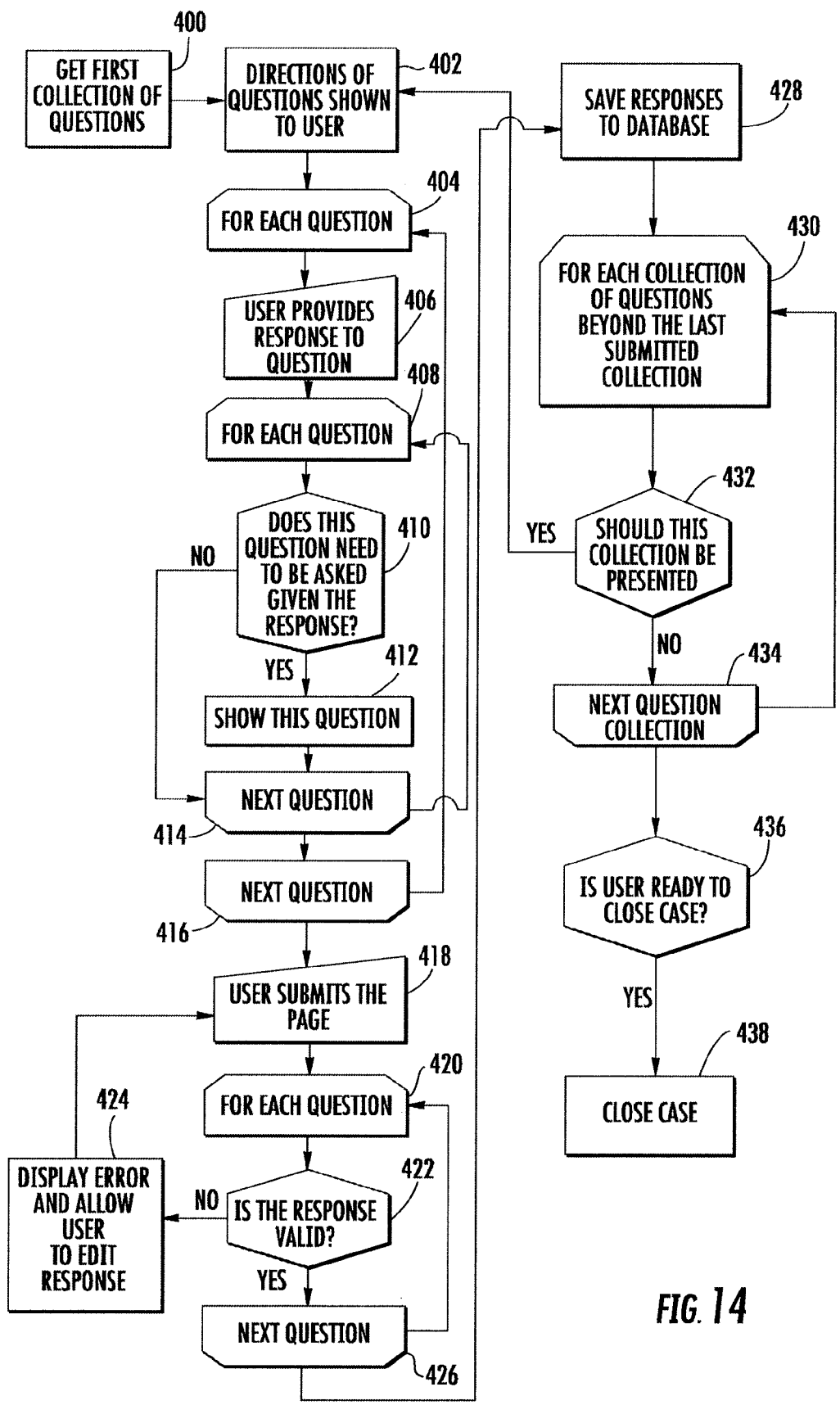
FIG. 14 is a flowchart of a questionnaire engine.

FIG. 14 is a flowchart illustrating the process of the questionnaire engine. The process is initiated by getting a first collection of questions 400. The collection of questions is shown to the user 402, and the user provides a response to each question 404, 406. Each collection of question has at least one revealed stem question and may have one or more hidden branch questions. The system then determines, using conditional logic, if the hidden branch question should be asked in view of the response to the stem question 408, 410. If so, the branch question is revealed to the user 412. The branch question then may become a stem question. If the hidden, branch question should not be asked, the system determines whether the following question should be asked 414. The process of determining whether each question in the collection should be asked continues until the user has been presented and has responded to all of the questions in the collection that should be asked 414, 416.

Once responses are received for each of the questions in a collection, the user is directed to submit the responses to the questions 418. The questionnaire engine then determines whether the response to each question is valid in satisfactory form 420, 422. If a response is not valid, an error message is displayed and the user is prompted to edit the response 424. If the response is valid, the response to the next question is analyzed similarly 426. Once all of the responses are deemed to be in satisfactory format, the responses are saved 428.

Once the responses to a question collection are saved, the applicant is unable to edit the responses. By prohibiting the applicant from changing or altering his answers, the positive response bias is minimized because it is more difficult for the applicant to anticipate the specific information that will be later requested and/or change responses to eliminate inconsistencies.

The questionnaire engine then determines whether the next collection of questions should be presented to the applicant 430, 432. If the next collection should be asked, the collection of questions is presented to the user 402 and the process continues as described above. If the collection of questions should not be asked, the next collection of questions is analyzed to determine whether it should be presented to the applicant 434. The process continues until all question collections have been presented to the user. The system then determines whether the user is ready to close the case 436, and if so, the case is closed 438.

Unlike traditional pencil and paper questionnaires, the questionnaire engine of the present invention contains logic that navigates the applicant through the questionnaire and specifies critical fields that must be completed before the applicant is allowed to continue. This advantageously decreases an applicant's susceptibility to response set bias, regardless of whether the questions are objective or subjective, because the applicant cannot anticipate what specific explanations are required or revisit previously submitted questions. Therefore, applicants cannot tailor their answers or try to avoid inconsistencies in their answers. Furthermore, the applicant does not have to sift through many non-applicable questions, and is less likely to omit critical information as a result of misunderstanding directions or overlooking questions.

In addition, known biodata questionnaires contain specific life history based questions that have been identified as predictive of performance. These are typically focused lists of only objectively scored questions, whose utility is necessarily limited to generation of biodata and resultant scores. The questionnaire engine of the present invention, however, develops comprehensive biographical information that can be used both to organize information for a background investigation tool and to derive biodata indices, which is discussed below. Further, the questionnaire engine gathers information and reports it in a standardized format that can be used by multiple agencies employing applicants in similar job classifications such as law enforcement, public safety, and criminal justice professions.

The questionnaire engine advantageously allows a collection of questions to elicit responses that relate to more than one life event type without revealing the relationship to the applicant. By "life event type," we mean a domain of life events, such as, education, work history or substance use. For example, an applicant may indicate in a collection of questions related to employment, his date of graduation from the police academy. In another collection of questions related to substance use, the applicant provides information about the last time he smoked marijuana. As discussed below, the rules processing engine will chronologically relate these two life events and may generate a negative indicator because the date of the applicant last smoked marijuana is after the graduation date. The applicant, however, is unlikely to detect such a relationship while providing life history information.

The logic of the questionnaire engine also advantageously allows the applicant to respond to questions in both objective and subjective formats. By "subjective," we mean a question that elicits a descriptive response. Objective questions generally require the applicant to answer the question "yes or no" or "true or false." Subjective questions are open-ended and are intended to elicit more detailed information than responses to the objective questions. By asking both objective and subjective questions, relevant information can be gathered in separate question collections, and then organized and presented to interested persons, such as investigators or hiring personnel, in a consistent manner.

For example, an applicant may indicate in a collection of employment questions that he/she has never been "formally disciplined" on a job. Several question collections later, however, the applicant may indicate in a detailed response to questions in an integrity collection that "I took some equipment home from work. I forgot about it until it came up missing in an audit; then I brought it back. I don't know if this is stealing or not but the boss wrote me up even though I returned it. After I returned it they took the letter out of my file." In this case, the applicant completed the employment questions with a positive bias, that is, by choosing not to present this event as an instance of "formal discipline." The applicant's response set in this case may have been that the incident was minor and because the "write up" was subsequently deleted, it was not worth mentioning. When completing the integrity section, however, the applicant's response set was somewhat different. The applicant was inclined to give substantially more detail about the event because the question did not relate to employment discipline. Therefore, the information sought by subjective, open-ended questions is sometimes less obvious to the applicant, which makes the applicant less susceptible to response set biases. Questions that elicit descriptive answers also provide the advantage of allowing the evaluator, rather than the applicant, to interpret specific events, determine areas for investigative follow-up, and assign biodata scoring points to the event.

FIGS. 5A-5M, collectively, are an example of a life history information report generated by the report engine (shown as 110 in FIG. 1). The report organizes the information acquired via the questionnaire engine by life event type.

The Rule Processing Engine

Returning to FIG. 1, the rule processing engine 112 generally analyzes the applicant's life history information and creates a number of life events based on that information. Negative indicators and critical items are identified from the life events and biodata values are calculated based on the critical items. These functions of the rule processing engine are performed by the live event engine and the critical item engine, which are discussed below in more detail.

The Life Events Engine

Figure 16:
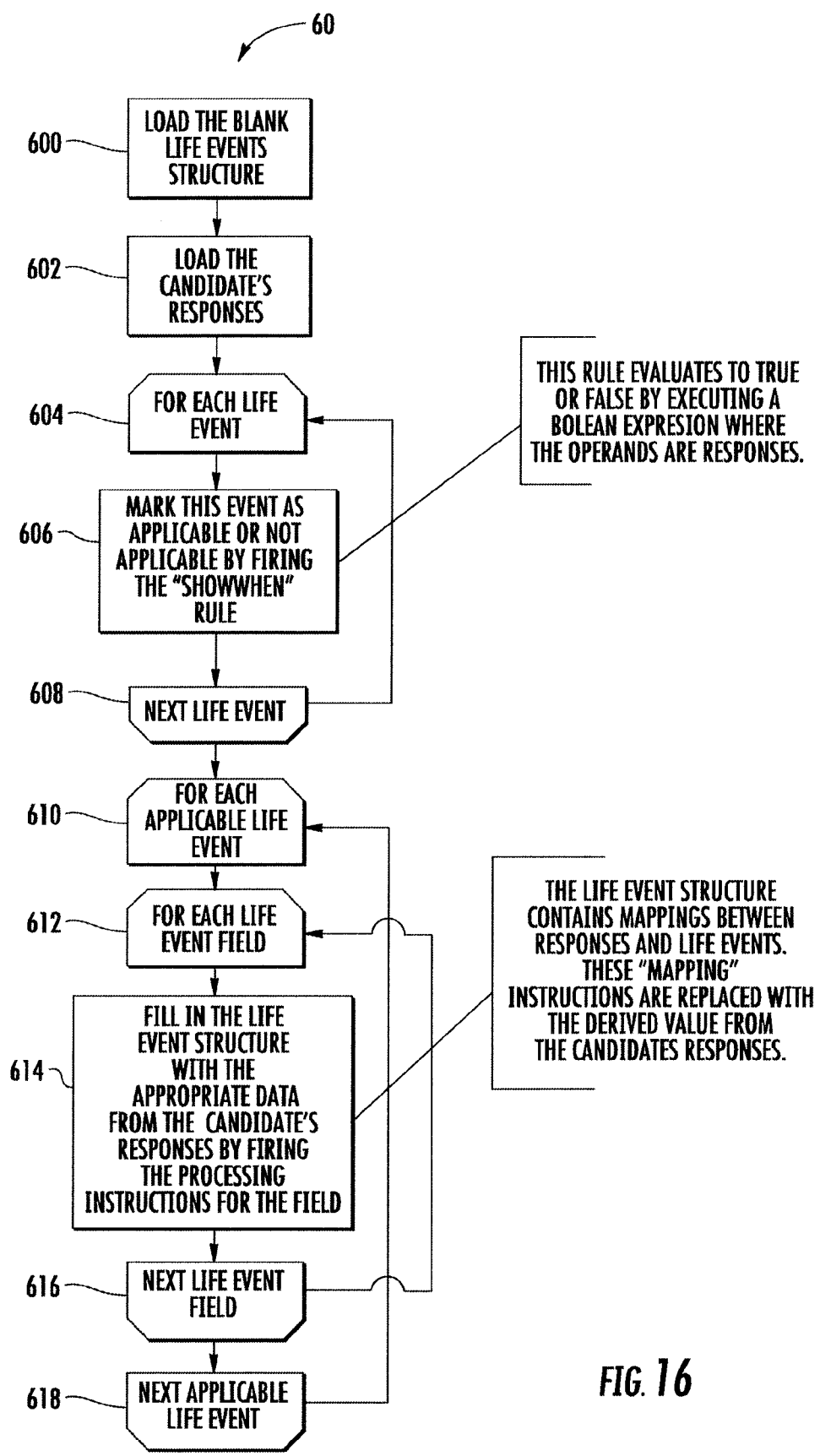
FIG. 16 is a flowchart of a life events engine.

FIG. 16 illustrates the flow of one of the components of the rule processing engine, namely, the life events engine 60. The life events engine 60 creates life events from the life history information acquired by the questionnaire engine.

In operation, the life events engine 60 loads the abstract life event data structure (described in FIG. 3) 600 and the applicant's responses to the life history questionnaire 602.

The life events engine then creates life events from the life history information. For each life event, the life events engine determines whether the life event is applicable by firing the ShowWhen rule associated with each life event 604, 606. A life event is applicable if it is a negative indicator or if it is relevant to a background investigation. The process identifying all applicable life events continues by examining the next life event 608 until all life events have been examined.

After all applicable life events have been identified, each life event field for each applicable life event is assigned a value based on the life history information acquired by the questionnaire engine 610, 612, 614. The elements of the life history information (that is, the applicant's responses to the questions presented by the questionnaire engine) are mapped to the fields of each applicable life event. After values are mapped to each life event field for an applicable life event, the next applicable life event is considered and the process of mapping responses to life event fields continues until all applicable life events have been processed (616, 618). By the process just described, the life events engine identifies the life events that are predictive of a predefined, negative objective outcome.

By "objective," we mean an observable outcome, such as, failure to complete training. By "negative," we mean an undesired outcome from the point of view of an employer or a potential employer. As discussed above, such life events are negative indicators because their occurrence indicates an increased risk of a particular negative outcome and/or the need for close investigation of the life event. The life events engine identifies these negative indicators by using conditional logic to chronologically relate the life events. The chronologically related life events are then compared with a predefined list of negative indicators. For example, such a process may identify the following chronologically related events: "the applicant accepts a job at less pay after stating the reason for leaving previous job was advancement," or "the applicant admits to smoking marijuana after date of his first application to the law enforcement agency."

In the preferred embodiment, the existence of any specific negative indicator, while mathematically accretive to a biodata value, does not unilaterally predict a specific, negative, objective outcome. In addition, some negative indicators are not assigned empirical values because, although they have been rationally linked to some a specific job dysfunction, their predictive validity has not yet been determined empirically. However, biodata values at sufficient levels have been found to predict dysfunction at specified levels of confidence. Nonetheless, the life events that are negative indicators are classified, stored, and reported because they may be relevant to investigators and evaluators. In an alternative embodiment, all life events that are negative indicators can be assigned a biodata value for use in a predictive index.

FIG. 17 is an example life events report generated by the present invention. The report preferably includes columns for the classification and type of event, name of the life event, beginning and end dates of the event, and frequency of the event.

The Critical Items Engine

Figure 18:
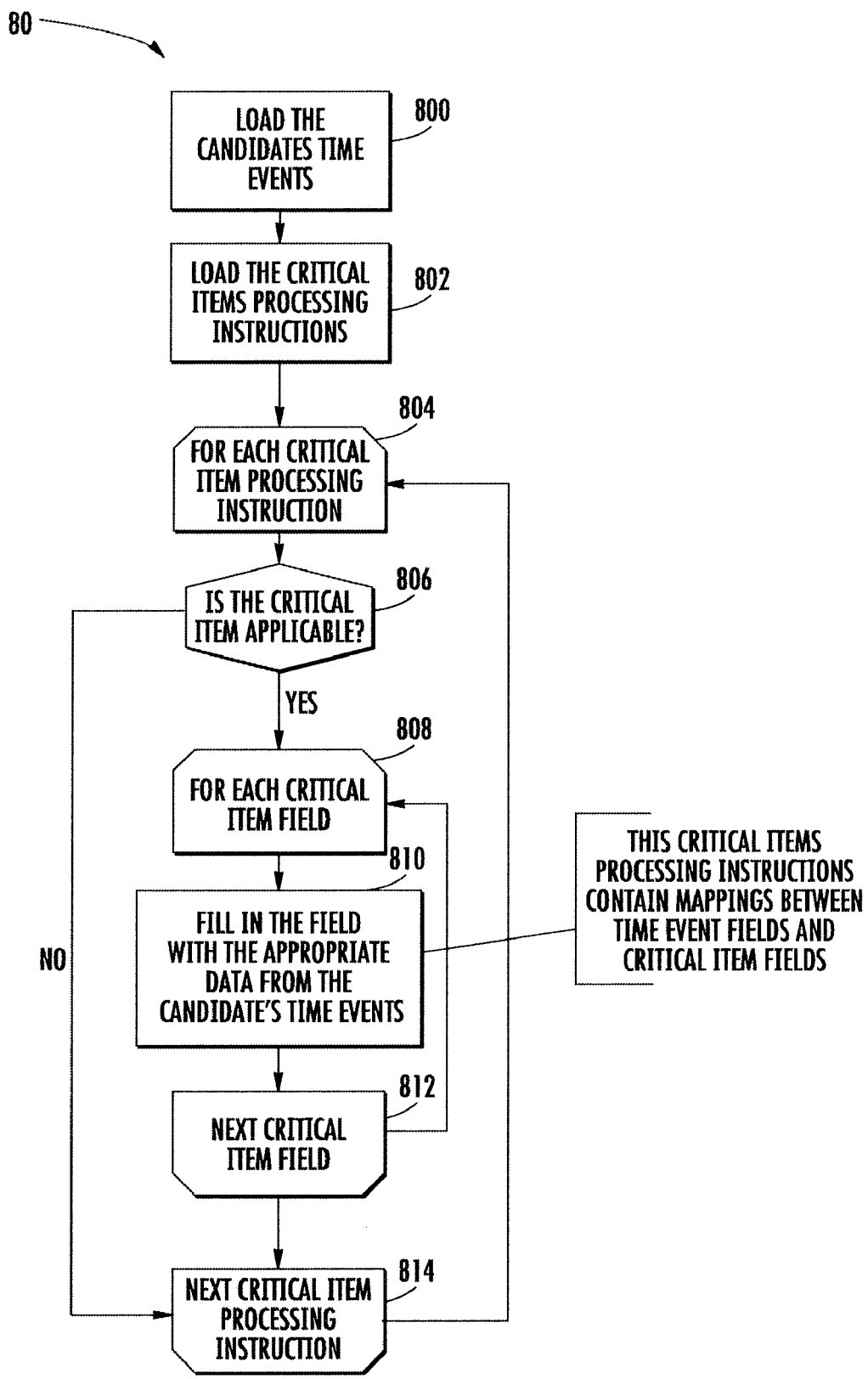
FIG. 18 is a flowchart of a critical items engine.

After the life events engine identifies the applicable life events, a critical items engine (the flow of which is illustrated in FIG. 18) determines which life events are critical items. In the preferred embodiment, a critical item is a life event that is assigned a specific value that is used to calculate a biodata index. As shown in FIG. 18, the life events that have been identified by the life event engine as negative indicators are instantiated 800. Next, critical item processing instructions are loaded and each critical item processing instruction is executed 802, 804. Next, each life event created by the life event engine is examined and the critical events engine determines whether the life event is a critical item 806. A critical item is a life event that has an empirically derived biodata value that is associated with the life event. If the life event is a critical item, each field of the critical item is assigned a value by mapping the value from the life event field to the corresponding critical item field 808, 810, 812. If the critical event is not applicable to calculating a biodata index, the next critical item is processed 814 and this process continues until each critical item has been examined.

FIG. 19 is an example of a critical items report 90 generated by the present invention. The critical items report preferably identifies the name of each life event that is a critical item 900, the beginning and end dates of the event 902, 904, the frequency of the event 906 and more detailed information about the life event 908. The report also includes a biodata value 910 for each critical item. A risk score is associated with each biodata index value and the total biodata index value. The risk score indicates whether the risk of a particular negative outcome, such as failure to complete training, is high or low.

It can be appreciated that generating a critical items report manually can be a time consuming, labor intensive task because the information required to identify critical items is dispersed through the life history information. In the present system, the critical items are automatically determined by the conditional logic of the life events engine, and the critical items engine automatically calculates the resultant biodata values and indices.

FIG. 20 is an example of a biodata summary 100 generated by the system and method of the present invention. As illustrated in FIG. 20, for each biodata index, the biodata summary 1000 shows the index name 1002, the index value 1004 and the risk score 1006. In the example, biodata indices are calculated for the following life event types: employment 1008, criminal 1010, substance abuse 1012 and other 1014. It should be understood that other critical items might be identified which would lead to the development of additional biodata indices.

These biodata values can be used alone, as an initial screening tool, or can be combined with other data, such as psychometric data. By "psychometric data," we mean data derived from one or more normatively based psychological test instruments. The use of the biodata values in conjunction with psychometric data may result in a more accurate prediction of a specific, objective, negative outcome.

Psychometric data is made up of subscales derived from one or more psychometric tests. These subscales are either measures of content, such as vocabulary and word knowledge; or psychological constructs, such as self-control, responsibility, integrity and cognitive ability. The specific subscales are identified and the weights are generated through discriminant function modeling, a known statistical procedure.

To build a discriminant function model, a group of applicants that experienced one or more certain negative outcomes is identified. This group is then matched with a group of applicants who did not experience the relevant negative outcome. The discriminant function model is then constructed using known actuarial procedures, and a set of equations would be generated. The specific sub scales, as well as the weights in the resultant equations, are specific to the applicant pool considered.

The above description of the preferred embodiments details many ways in which the present invention can provide its intended purposes. Programmers skilled in the art are able to produce workable computer programs to practice the teachings set forth above. While several preferred embodiments are described in detail hereinabove, it is apparent that various changes might be made without departing from the scope of the invention, which is set forth in the accompanying claims.

What is claimed is:

1. A computer based method for acquiring life history information from an applicant for employment to minimize positive response bias and enhance the veracity of the acquired life history information, comprised of:

presenting to the applicant a collection of questions related to life history information, the life history information comprising information about more than one life event, the question collection being comprised of a revealed stem question relating to a first life event that occurred at a first time and a hidden branch question relating to a second life event that occurred at a second time;

receiving from the applicant a response to the revealed stem question and storing the revealed stem question response in a computer database;

based on the revealed stem question response, automatically determining whether to present the hidden branch question to the applicant;

if, after the automatic determination, the hidden branch question is to be presented to the applicant, revealing the hidden branch question to the applicant, receiving from the applicant a response to the hidden branch question and storing the hidden branch question response in the computer database; and determining a critical item, the determination identifying a chronological inconsistency, based on the response to the revealed stem question compared to the response to the hidden branch question, and wherein the critical item has been empirically related to a predefined negative outcome.

2. The method of claim 1, wherein the applicant is an applicant for a law enforcement, criminal justice or public safety employment.

3. The method of claim 1, wherein the predefined negative outcome is an objective outcome.

4. The method of claim 3, wherein the predefined objective, negative outcome is failure to complete training.

5. The method of claim 3, wherein the predefined objective, negative outcome is receipt of a predefined disciplinary action.

6. The method of claim 3, wherein the predefined objective, negative outcome is notification of a performance deficiency.

7. The method of claim 1, wherein the responses to the revealed stem question and the hidden branch question are comprised of descriptive information.

8. The method of claim 1, wherein the revealed stem question response cannot be altered by the applicant after the revealed stem question response is received from the applicant.

9. A computer readable medium comprising software for acquiring life history information from an applicant for employment to minimize positive response bias and enhance the veracity of the acquired life history information, wherein the software instructs a computer to:

present to the applicant a collection of questions related to life history information, the life history information comprising information about more than one life event, the question collection being comprised of a revealed stem question relating to a first life event that occurred at a first time and a hidden branch question relating to a second life event that occurred at a second time;

receive from the applicant a response to the revealed stem question and storing the revealed stem question response in a computer database;

based on the revealed stem question response, automatically determining whether to present the hidden branch question to the applicant;

if, after the automatic determination, the hidden branch question is to be presented to the applicant, revealing the hidden branch question to the applicant, receiving from the applicant a response to the hidden branch question and storing the hidden branch question response in the computer database; and determine a critical item, the determination identifying a chronological inconsistency, based on the response to the revealed stem question compared to the response to the hidden branch question, and wherein the critical item has been empirically related to a predefined negative outcome.

10. The computer readable medium of claim 9, wherein the applicant is an applicant for law enforcement, criminal justice or public safety employment.

11. The computer-readable medium method of claim 9, wherein the predefined outcome is an objective outcome.

12. The computer readable medium of claim 9, wherein the predefined outcome is a negative outcome.

13. The computer readable medium of claim 9, wherein the predefined negative outcome is an objective outcome.

14. The computer readable medium of claim 13, wherein the predefined objective, negative outcome is the applicant's failure to complete training.

15. The computer readable medium of claim 13, wherein the predefined objective, negative outcome is the applicant's receipt of a predefined disciplinary action.

16. The computer readable medium of claim 13, wherein the predefined objective, negative outcome is notification of a performance deficiency.

17. The computer readable medium of claim 9, wherein the responses to the revealed stem question and the hidden branch question are comprised of descriptive information.

18. The computer readable medium of claim 9, wherein the revealed stem question response cannot be altered by the applicant after the revealed stem question response is received from the applicant.

19. A computer-based system for acquiring life history information from an applicant for employment to minimize positive response bias and enhance the veracity of the acquired life history information, comprising:

a user interface for:

presenting to the applicant a collection of questions related to life history information, the life history information comprising information about more than one life event, the question collection being comprised of a revealed stem question relating to a first life event that occurred at a first time and a hidden branch question relating to a second life event that occurred at a second time; and receiving from the applicant a response to the revealed stem question and storing the revealed stem question response in a computer database; and a computer processor that:
- automatically determines whether to present the hidden branch question to the applicant based on the revealed stem question response;
- if, after the automatic determination, the hidden branch question is to be presented to the applicant, reveals the hidden branch question to the applicant, receives from the applicant a response to the hidden branch question and stores the hidden branch question response in the computer database; and
- determines a critical item, the determination identifying a chronological inconsistency, based on the response to the revealed stem question compared to the response to the hidden branch question, and wherein the critical item has been empirically related to a predefined negative outcome.

20. The computer-based system of claim 19, wherein the applicant is an applicant for law enforcement, criminal justice or public safety employment.

21. The computer-based system of claim 19, wherein the predefined outcome is an objective outcome.

22. The computer-based system of claim 19, wherein the predefined outcome is a negative outcome.

23. The computer-based system of claim 22, wherein the predefined negative outcome is an objective outcome.

24. The computer-based system of claim 23, wherein the predefined objective, negative outcome is the applicant's failure to complete training.

25. The computer-based system of claim 23, wherein the predefined objective, negative outcome is the applicant's receipt of a predefined disciplinary action.

26. The computer-based system of claim 23, wherein the predefined objective, negative outcome is notification of a performance deficiency.

27. The computer-based system of claim 19, wherein the predefined negative outcome is selected from the group consisting of an employment event, a criminal event and a substance event.

28. The computer-based system of claim 19, wherein the responses to the revealed stem question and the hidden branch question are comprised of descriptive information.

29. The computer-based system of claim 19, wherein the revealed stem question response cannot be altered by the applicant after the revealed stem question response is received from the applicant.

30. The method of claim 1, wherein the predefined negative outcome is selected from the group consisting of an employment event, a criminal event and a substance event.

31. The computer readable medium of claim 9, wherein the predefined negative outcome is selected from the group consisting of an employment event, a criminal event and a substance event.

32. The method of claim 1, wherein the revealed stem question response cannot be altered by the applicant after the hidden branch question is revealed to the applicant.

33. The computer readable medium of claim 9, wherein the revealed stem question response cannot be altered by the applicant after the hidden branch question is revealed to the applicant.

34. The computer-based system of claim 19, wherein the revealed stem question response cannot be altered by the applicant after the hidden branch question is revealed to the applicant.

* * * * *

UNITED STATES PATENT AND TRADEMARK OFFICE
CERTIFICATE OF CORRECTION

PATENT NO. : 7,346,541 B1
APPLICATION NO. : 09/638650
DATED : March 18, 2008
INVENTOR(S) : Cuttler et al.

Page 1 of 1

It is certified that error appears in the above-identified patent and that said Letters Patent is hereby corrected as shown below:

On the Title Page under item (73), "Assignee": "Law Enforcement Services, Inc., Greensboro, NC (US)" should be replaced with -- Michael J. Cuttler, Greensboro, NC (US); Ellen B. Cuttler, Greensboro, NC (US) --

Signed and Sealed this

Eighth Day of December, 2009

David J. Kappos
*Director of the United States Patent and Trademark Office*